United States Patent
Humphris

(10) Patent No.: US 10,107,834 B2
(45) Date of Patent: Oct. 23, 2018

(54) MEASUREMENT SYSTEM

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

(*) Notice: Subject to any disclaimer, the term of this patent is extended or adjusted under 35 U.S.C. 154(b) by 0 days.

(21) Appl. No.: 15/463,699

(22) Filed: Mar. 20, 2017

(65) Prior Publication Data

US 2018/0267081 A1 Sep. 20, 2018

(51) Int. Cl.
*G01Q 20/02* (2010.01)
*G01Q 30/02* (2010.01)
(Continued)

(52) U.S. Cl.
CPC ............ *G01Q 20/02* (2013.01); *G01Q 40/00* (2013.01); *G01Q 70/00* (2013.01)

(58) Field of Classification Search
CPC .......... G01N 21/3563; G01N 21/3581; G01N 21/552; G01N 29/0681; G01N 29/2418; G01N 29/265; G01N 2291/0231; G01N 2291/0232; G01N 2291/02827; G01N 2291/0427
(Continued)

(56) References Cited

U.S. PATENT DOCUMENTS 7,253,408 B2 8/2007 West
8,220,066 B2 * 7/2012 Humphris .............. G01Q 70/04
356/487
(Continued)

FOREIGN PATENT DOCUMENTS

EP 2023372 A1 2/2009
JP 2003-228161 A 8/2003
(Continued)

OTHER PUBLICATIONS

Sugihara et al., "Optical beam-deflection scanning force microscope with easy cantilever-laser beam alignment," *Journal of Vacuum Science & Technology*, 12(2) (1994).

*Primary Examiner* — David A Vanore
(74) *Attorney, Agent, or Firm* — Marshall, Gerstein & Borun LLP

(57) ABSTRACT

A measurement system comprising: a radiation source arranged to generated a detection beam; a probe; and a probe positioning system arranged to move the probe from an un-aligned position in which it is not illuminated by the detection beam, to an aligned position in which it is illuminated by the detection beam and the detection beam is reflected by the probe to generate a reflected detection beam. A scanner generates a relative scanning motion between the probe and a sample, the sample being aligned with the probe and interacting with the probe during the relative scanning motion. A sensor detects the reflected detection beam during the relative scanning motion to collect a first data set from the sample. A second device is provided for modifying the sample or obtaining a second data set from the sample. A sample stage is arranged to move the sample in accordance with an offset vector stored in a memory so that it becomes un-aligned from the probe and aligned with the second device.

20 Claims, 10 Drawing Sheets

(51) Int. Cl.
*G01Q 70/10* (2010.01)
*G01Q 70/00* (2010.01)
*G01Q 40/00* (2010.01)

(58) Field of Classification Search
USPC ........ 850/1, 3, 33, 6, 2, 21, 26, 36, 38, 4, 5, 850/50, 55, 56, 7; 250/307, 339.07
See application file for complete search history.

(56) References Cited

U.S. PATENT DOCUMENTS

| | | | |
|---|---|---|---|
| 9,449,785 B2* | 9/2016 | Price | H01J 37/20 |
| 2004/0083799 A1* | 5/2004 | Markakis | B82Y 35/00 |
| | | | 73/105 |
| 2014/0027512 A1* | 1/2014 | Baur | B82Y 35/00 |
| | | | 235/439 |
| 2017/0016932 A1* | 1/2017 | Humphris | G01Q 10/045 |
| 2017/0074901 A1* | 3/2017 | Humphris | G01Q 10/045 |

FOREIGN PATENT DOCUMENTS

| | | |
|---|---|---|
| WO | WO-2012/104625 A1 | 8/2012 |
| WO | WO-2012/163518 A1 | 12/2012 |
| WO | WO-2013/114100 A1 | 8/2013 |
| WO | WO-2013/142489 A1 | 9/2013 |
| WO | WO-2014/057268 A1 | 4/2014 |

\* cited by examiner

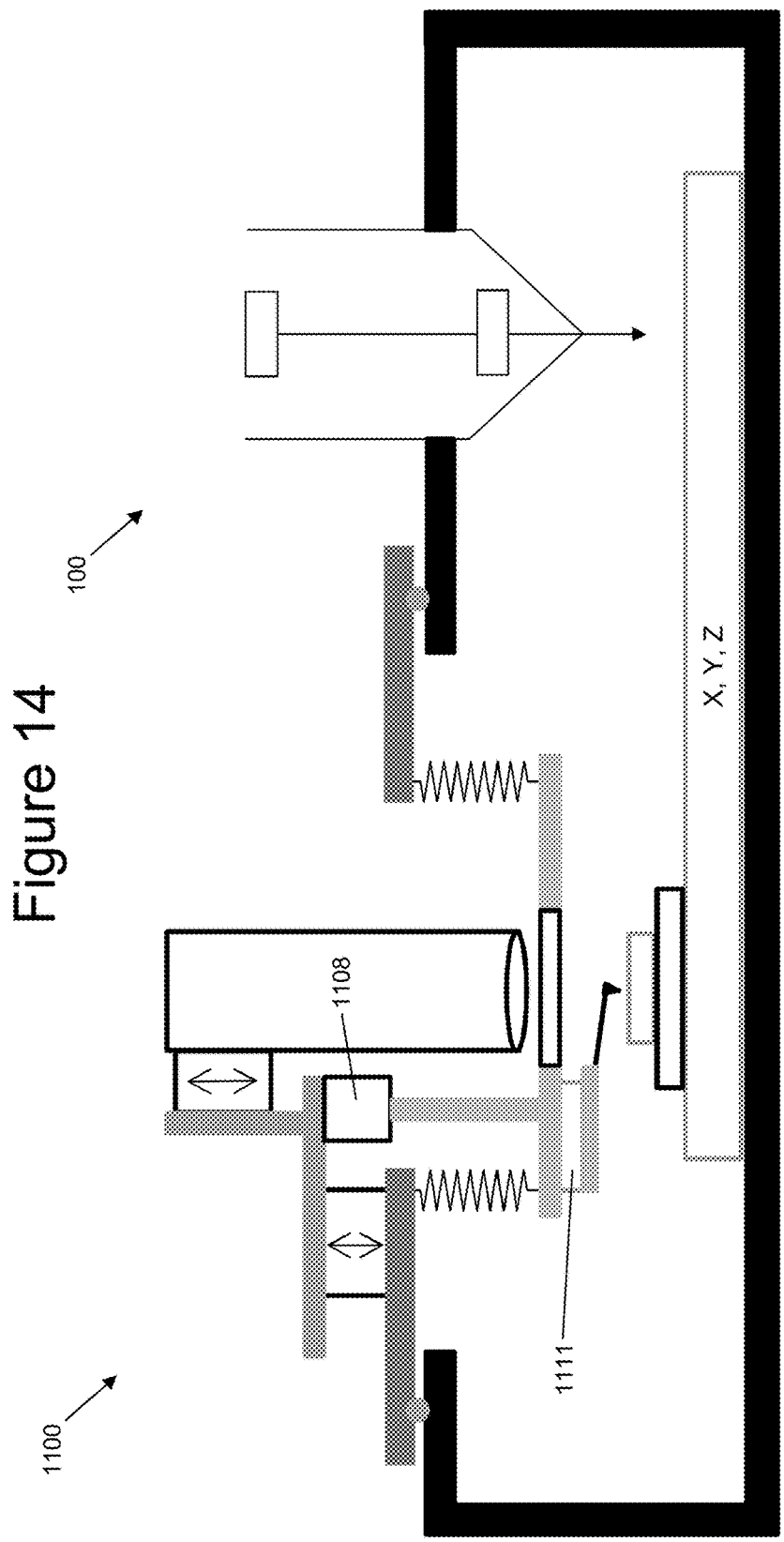

MEASUREMENT SYSTEM

FIELD OF THE INVENTION

The present invention relates to a method of analysing a sample, a measurement system, a scanning probe microscope, and a method of calibrating a scanning probe microscope.

BACKGROUND OF THE INVENTION

It is often valuable to be able to combine a scanning probe microscope with a second device such as a scanning electron microscope. It would be desirable to be able to quickly and accurately move a sample between the two devices.

In a probe microscope with a cantilever carrying a probe tip, the precise position of the probe tip is not known so the probe tip is offset from its intended position by a tip error vector. It would be desirable for this tip error vector to be accurately accounted for during operation of the microscope.

SUMMARY OF THE INVENTION

A first aspect of the invention provides a measurement system according to claim 1. The first aspect of the invention also provides a method of analysing a sample, the method comprising: moving a probe laterally relative to a detection beam so that it is aligned with the detection beam and the detection beam is reflected by the probe to generate a reflected detection beam; generating a relative scanning motion between the probe and a sample, the sample being aligned with the probe and interacting with the probe during the relative scanning motion; detecting the reflected detection beam with a sensor during the relative scanning motion to collect a first data set from the sample; after or before the collection of the first data set, moving the sample in accordance with a stored offset vector so that it becomes unaligned from the probe and aligned with a second device, or vice versa; and with the sample aligned with the second device and un-aligned from the probe, operating the second device to modify the sample or obtain a second data set from the sample.

The first aspect of the invention provides a method and associated measurement system in which a sample is inspected by a probe microscope, and also modified or inspected by an adjacent second device. The method enables the sample to be quickly and accurately moved from the probe to the second device (or vice versa). If a new probe is required then the method can be repeated using the new probe.

A probe positioning system is arranged to move the probe laterally relative to the detection beam to align the probe with the detection beam. The probe is brought into alignment with the detection beam by moving the probe rather than moving the detection beam. As a result, an offset between the detection beam and the second device is accurately known and does not vary if the probe is replaced by a new probe.

Typically the probe positioning system is arranged to move the probe laterally relative to the detection beam in order to move the probe from an un-aligned position in which it is not illuminated by the detection beam, to an aligned position in which it is illuminated by the detection beam and the detection beam is reflected by the probe to generate the reflected detection beam. Alternatively the range of motion imparted by the probe positioning system may be smaller, so the probe is illuminated by the detection beam at all times and the probe positioning system is used to accurately align the detection beam with a desired point on the probe.

The second device may for example be a scanning beam microscope such as an electron microscope (SEM). Alternatively the second device may be a focused ion beam (FIB) device which is used to modify or repair the sample (which may be for example a semiconductor wafer or mask). Alternatively the second device may be a time-of-flight mass spectrometer or other device for analysing the sample. Alternatively the second device may be an optical metrology instrument such as a profileometer or scatterometer. In another example, the probe provides a principle source of imaging information (e.g. the detection of defect pits or bumps in EUV substrates) and the second device is used to process or fabricate an area on the sample identified by the probe, for example by laser annealing or focused ion beam processing of the area.

Optionally the method further comprises performing a calibration procedure to determine and store the offset vector. The calibration procedure may be performed to determine and store the offset vector in a memory for use during the method. The calibration procedure may be performed after collection of the first data set, but more preferably it is performed before collection of the first data set.

Optionally the calibration procedure comprises measuring the offset vector using an external measurement instrument. However more preferably the calibration procedure comprises: generating a relative scanning motion between the probe and a calibration sample carrying a fiducial marker, the calibration sample interacting with the probe during the relative scanning motion; detecting the reflected detection beam with the sensor during the relative scanning motion to collect a first calibration data set from the calibration sample, the first calibration data set including fiducial data from at least part of the fiducial marker; and determining the offset vector in accordance with a position of the fiducial data within the first calibration data set. Manufacturing errors can result in a tip of the probe being displaced slightly from its intended position. The calibration process enables this tip displacement to be accurately accounted for in the stored offset vector.

Optionally the calibration procedure further comprises: with the sample aligned with the second device and un-aligned from the probe, operating the second device to obtain a second calibration data set from the calibration sample, the second calibration data set including fiducial data from at least part of the fiducial marker; and determining the offset vector in accordance with a position of the fiducial data within the second calibration data set. This part of the calibration procedure may be performed before or after the first calibration data set is obtained by the probe.

In one example the second device obtains the second calibration set before the first calibration set is obtained; the calibration sample is moved until the fiducial data is centred within the second calibration set (or at some other predetermined position); the calibration sample is moved from the second device to the aligned position by a known datum vector; and the first calibration data set is then obtained to determine the position of the fiducial data within the first calibration data set (for instance by moving the calibration sample until the fiducial marker is entered within the first calibration data set, or by automatically analysing the position of the fiducial data within the first calibration data set). The stored offset vector can then be determined in accordance with the known datum vector and the offset determined from the first calibration data set. Alternatively this process may be reversed, so that the probe obtains the first calibration set before the second calibration set is obtained; the calibration sample is moved until the fiducial data is centred within the first calibration set (or at some other predetermined position); the calibration sample is moved by a known datum vector from the aligned position under the probe to the second device; the second device is operated to obtain a second calibration data set from the calibration sample, the second calibration data set including fiducial data from at least part of the fiducial marker; and the offset vector is determined in accordance with a position of the fiducial data within the second calibration data set.

In the case where a fiducial marker is used, then the marker must be detectable by the probe and may for example have topographic features with sharp well-defined edges which can be detected by the probe with high contrast. Alternatively the fiducial marker may be flat, but formed from a different material to the material making up the rest of the calibration sample. For instance they may be made of different polymers which have different degrees of compliance which can be sensed by the probe.

The fiducial marker may be an intended and predetermined feature on a pre-prepared special calibration sample, or an unknown (i.e. not predetermined) feature.

After performance of the method, the probe may be moved so that it moves away from the aligned position and is no longer illuminated by the detection beam. The method can then be repeated with a new probe.

Optionally the probe and the second device are housed within the same vacuum chamber, and the method further comprises evacuating the vacuum chamber.

A second aspect of the invention provides a scanning probe microscope according to claim 9, and a method of calibrating a scanning probe microscope according to claim 20.

The second aspect of the invention provides a method of calibrating a scanning probe microscope which can be used in order to determine an error vector for a given probe. If the probe is replaced by a new probe then the calibration process can be repeated using the new probe.

Manufacturing errors can result in the probe tip being offset slightly from its intended position by a tip error vector. The second aspect of the invention provides a calibration process and associated apparatus which enables this tip error vector to be accurately accounted for, in order to accurately move a sample into alignment with the probe tip.

The fiducial marker must be detectable by the probe and may for example have topographic features with sharp well-defined edges which can be detected by the probe with high contrast. Alternatively the fiducial marker may be flat, but formed from a different material to the material making up the rest of the sample. For instance they may be made of different polymers which have different degrees of compliance which can be sensed by the probe.

The fiducial marker may be an intended and predetermined feature on a pre-prepared special calibration sample, or an unknown (i.e. not predetermined) feature.

Optionally the first and second aspects of the invention can be combined, the error vector from the second aspect of the invention being used to determine the offset vector which is used in the first aspect. Alternatively the second aspect of the invention may be used independently of the first aspect—for instance it can be used to determine the error vectors for a plurality of probes so they can be interchanged with each other within a scanning probe microscope without losing registration with a particular point on a sample.

In either aspect of the invention the method optionally further comprises illuminating the probe at the aligned position with an actuation beam, and operating the actuation beam so that it causes the probe to deform. The deformation of the probe may cause it to move laterally relative to the sample, to move towards or away from the sample, or the probe may deform before the sample is aligned with the probe. The probe is brought into alignment with the actuation beam by moving the probe rather than moving the actuation beam. As a result, an offset between the actuation beam and the second device is accurately known and does not vary when the probe is replaced by a new probe.

For example the actuation beam may comprises a probe selection beam which illuminates the probe before the relative scanning motion (and before or after the sample is aligned with the probe) and causes the causes the probe to move towards the sample (if present) out of a common plane which contains the new probe and one or more further probes. The new probe and the one or more further probes remain in the same plane (which may the common plane or another plane) during the relative scanning motion between the probe and the sample. Similarly the new probe is illuminated at the aligned position (before the relative scanning motion between the new probe and the sample) with the same probe selection beam which causes the causes the new probe to deform, the deformation of the new probe causing it to move out of the common plane. The probe and the one or more further probes remain in the same plane (which may the common plane or another plane) during the relative scanning motion between the new probe and the sample. Alternatively the probes may be moved in and out of the common plane by another mechanism, such as a resistive heater or piezoelectric device.

In another example the actuation beam comprises a cyclic actuation beam which is operated so that it causes the probe to deform, the deformation of the probe causing it to move towards and away from the sample during the relative scanning motion. Alternatively the probe may be moved towards and away from the sample during the relative scanning motion by another mechanism, such as a resistive heater or piezoelectric device.

In a preferred embodiment the probe is illuminated by both a cyclic actuation beam and a probe selection beam.

In the case where the probe is housed in a vacuum chamber, then optionally the detection beam (along with the actuation beam(s) if present) passes through a window from outside the vacuum chamber into the vacuum chamber. This makes it unnecessary to pass electrical power cables into the vacuum chamber in order to provide power for the beam(s) or for an alternative probe actuation system such as a resistive heater or piezoelectric material.

Optionally the system of the first or second aspect of the invention further comprises an enclosure containing a sealed chamber, the enclosure comprising a body and a window unit; wherein the radiation source is outside the sealed chamber; the radiation source is arranged to direct the detection beam through the window unit into the sealed chamber; the probe is inside the sealed chamber and carried by the window unit; the sample stage is inside the sealed chamber; and the probe positioning system is arranged to move the window unit in a lateral direction relative to the body of the enclosure in order to align the probe with the detection beam.

Optionally the system further comprises a flexible seal member connecting the window unit to the body, wherein the flexible seal member is arranged to flex to accommodate the movement of the window unit in the lateral direction. The flexible seal member may be a flexible rubber tube, or bellows (made from a flexible material such as rubber, or a less flexible material such as stainless steel) arranged to flex laterally to accommodate the movement of the window unit in the lateral direction.

The bellows may be hydraulically formed bellows, but preferably they are edge-welded bellows—i.e. a stack of hoops with each hoop welded at its edge to two adjacent hoops.

Optionally the scanner comprises a piezoelectric actuator which is inside the sealed chamber, connects the probe to the window unit, and generates the relative scanning motion by moving the probe relative to the window unit.

A third aspect of the invention provides a scanning probe microscope according to claim 10. An enclosure of the microscope comprises a body, a window unit, and bellows connecting the window unit to the body. Optionally the bellows are tubular. They may have a circular shape when viewed axially, or any other shape such as elliptical or square.

The bellows may be made from a flexible material such as rubber, or a less flexible material such as stainless steel. The bellows are arranged to flex laterally to movement of the window unit relative to the body. The bellows may be hydraulically formed bellows, but preferably they are edge-welded bellows—i.e. a stack of hoops with each hoop welded at its edge to two adjacent hoops.

Optionally the window unit consists of a frameless transparent window, and the bellows and probe are connected directly to the window. Alternatively the window unit comprises: a window mount; and a window carried by the window mount, wherein the bellows connect the window mount to the body, the radiation source is arranged to direct the detection beam through the window into the sealed chamber, and the probe positioning system is arranged to move the window mount in the lateral direction relative to the body of the enclosure.

Preferably the scanner comprises a piezoelectric actuator which is inside the sealed chamber, connects the probe to the window unit, and generates the relative scanning motion by moving the probe relative to the window unit.

Optionally the radiation source comprises a lens, and the apparatus further comprises a lens actuator arranged to move the lens towards or away from the window unit and the probe in order to focus the detection beam on the probe.

Optionally the sealed chamber is an interior volume surrounded by the bellows. In this case, as the bellows compress axially, the probe and window unit will move towards the sample support. However this arrangement is not preferred since it limits the volume of the sealed chamber. Therefore more preferably the body of the enclosure comprises an opening with a periphery; the bellows connects the window unit to the body around the periphery of the opening; and the bellows surrounds an interior volume which is outside the sealed chamber. In this case, as the bellows compress axially, the probe and window unit will move away from the sample support.

Optionally the window unit is permanently fitted to the body of the enclosure. However more preferably the body of the enclosure comprises a base, and a window holder attached to the base; the bellows connect the window unit to the window holder; and the window holder can be detached from the base to gain access to the sealed chamber. Alternatively, access to the chamber may be achieved by another route.

A probe positioning system is arranged to move the probe laterally relative to the detection beam to align the probe with the detection beam. The probe is arranged to move relative to the body as it moves relative to the detection beam, and the bellows are arranged to flex laterally to accommodate the movement of the window unit relative to the body. Optionally the probe positioning system is arranged to move the window unit in an axial direction relative to the body of the enclosure towards the sample support, and the bellows are arranged to expand axially to accommodate the movement of the window unit in the axial direction towards the sample support. Alternatively the bellows may be arranged to contract axially to accommodate the movement of the window unit in the axial direction towards the sample support.

Typically the probe positioning system is arranged to move the probe laterally relative to the detection beam in order to move the probe from an un-aligned position in which it is not illuminated by the detection beam, to an aligned position in which it is illuminated by the detection beam and the detection beam is reflected by the probe to generate the reflected detection beam. Alternatively the range of motion imparted by the probe positioning system may be smaller, so the probe is illuminated by the detection beam at all times and the probe positioning system is used to accurately align the detection beam with a desired point on the probe.

Typically the probe positioning system comprises a lateral drive motor arranged to move the window unit in the lateral direction; and an axial drive motor arranged to move the window unit in the axial direction.

Preferably the probe positioning system is capable of moving the window unit in the lateral direction relative to the body of the enclosure by a distance of 1 mm or more.

The sealed chamber may be a sealed vacuum chamber, or a sealed chamber containing a controlled atmosphere or liquid.

In any of the first, second or third aspects of the invention, the detection beam and the actuation beam (if present) may be turned on as the probe is aligned with the detection beam and/or the actuation beam. In this case the probe is illuminated by the beam(s) as soon as it reaches the aligned position. Alternatively one or more of the beam(s) may be turned off as the probe moves to the aligned position, then turned on after the probe has reached the aligned position so the probe is then illuminated.

In the first, second and third aspects of the invention, a sensor is arranged to detect a reflected detection beam during the relative scanning motion to collect a data set from a sample. The sensor may be part of an interferometer-based detection system, or part of an optical-lever based detection system for example.

BRIEF DESCRIPTION OF THE DRAWINGS

Embodiments of the invention will now be described with reference to the accompanying drawings, in which:

FIG. 14 shows a measurement system including the scanning probe microscope of FIG. 11 sharing a vacuum chamber with a scanning electron microscope.

DETAILED DESCRIPTION OF EMBODIMENT(S)

Figure 1:
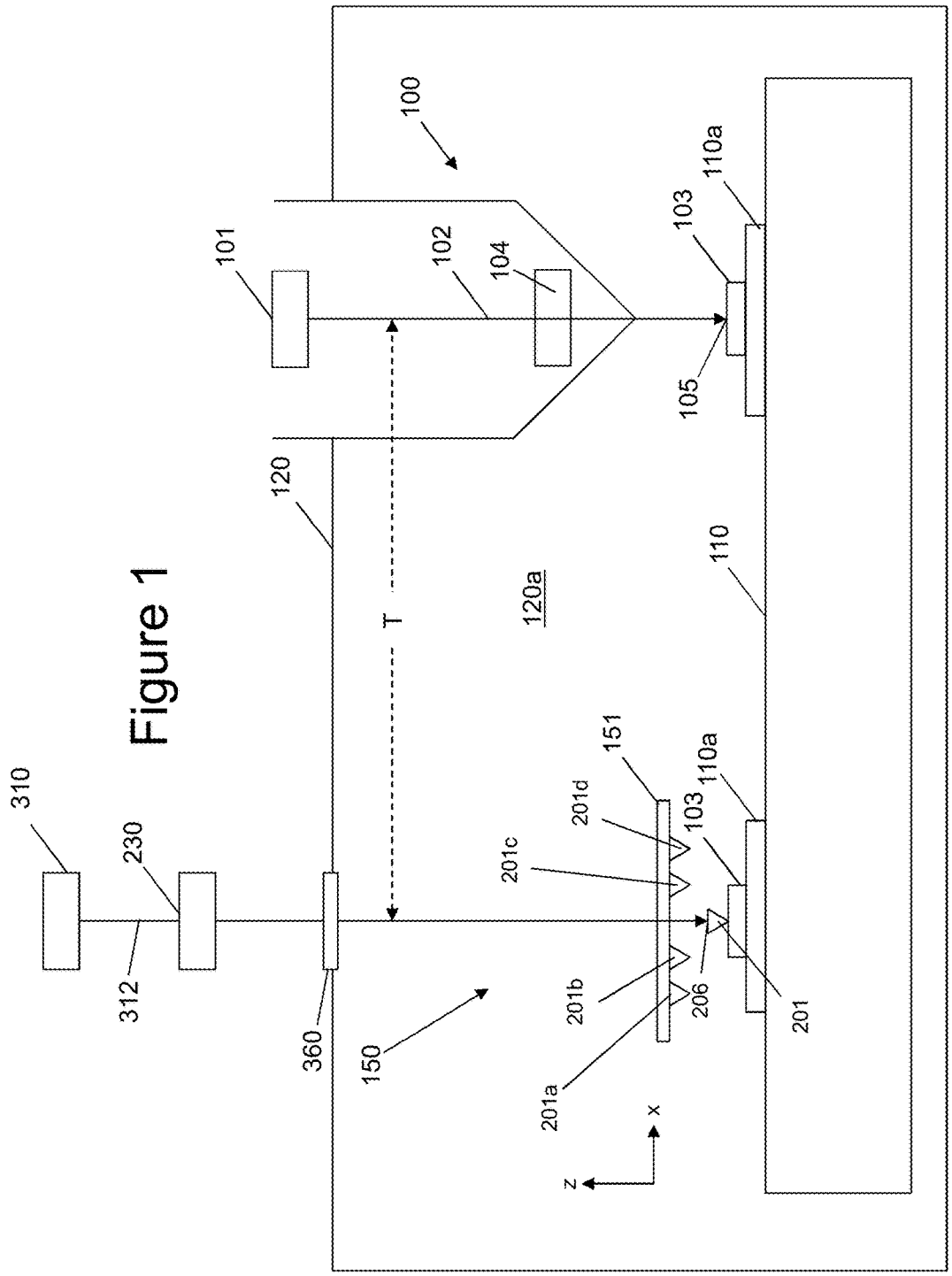
FIG. 1 is a schematic front view of a measurement system.

FIG. 1 is a front view of a measurement system comprising a scanning electron microscope (SEM) 100 and a scanning probe microscope (SPM) 150. Certain parts of the SEM and SPM are housed within an enclosure 120 containing an evacuated common vacuum chamber 120a. The SEM 100 comprises an electron beam source 101 which is arranged to direct an electron beam 102 onto a sample 103. An XY sample stage 110 is used to control the XY position of the sample 103. The XY sample stage 110 comprises a sample support 110a which carries the sample 103, and an actuation system (not shown) which can move the sample support 103a laterally in the XY plane. An e-beam scanner 104 can scan the beam 102 over a scan area of the sample in a raster scanning motion, enabling an SEM data set to be acquired by the SEM 100. Alternatively the raster scan may be acquired by keeping the beam 102 stationary and moving the sample 103 with the XY sample stage 110. The beam 102 illuminates the sample 103 at a datum detection point 105 when it is at a central point of the scan area (i.e. the field of view of the SEM). A vertical line through this datum detection point 105 is referred to below as the datum axis of the SEM 100.

The SPM 150 comprises an array of probes extending from a probe support 151. A selected one of the probes is shown from the side in FIG. 2. Each probe comprises a cantilever beam 200 carrying a conical or pyramidal tip 201 which tapers to a point and is located towards a free distal end of the cantilever beam. A piezoelectric probe positioning system 210 is arranged to move the probe support 151 in X, Y and Z directions.

The probe positioning system 210 is operable to move the probe support 151 towards and away from the sample (in the Z direction) over ranges larger than that achievable by the thermal bimorph actuation of the probe which will be described below.

Each probe is generally fabricated from silicon or silicon nitride. Typically, the cantilever beam 200 is around 50-200 μm long, 20-50 μm wide and around 0.2-2 μm thick, but this size can of course be varied according to application. The shape may also be varied: typically it is rectangular or triangular with, in the latter case, the tip in the vicinity of its apex. The tip 201 is typically 5 μm at its base, 3-10 μm high and with an end radius of curvature of 2-20 nm. In use, the fine point at the end of the tip is oriented towards the sample. Recently, smaller dimension probes have been fabricated for use at faster imaging speeds. These probes have cantilever beams around 5-20 μm long and 3-10 μm wide, with a correspondingly smaller tip.

Figure 3:
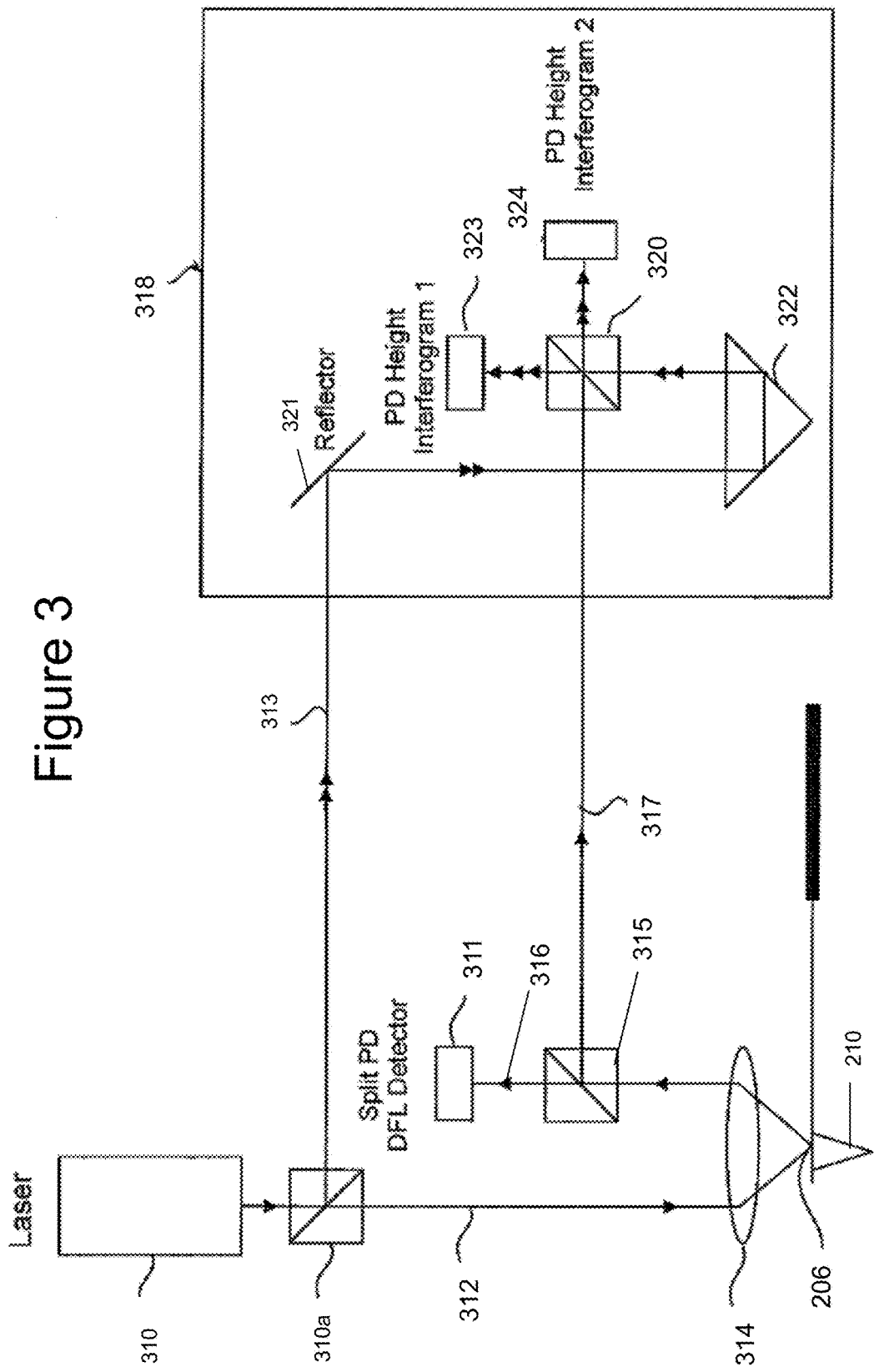
FIG. 3 is a schematic view of the probe detection system, with the selected one of the probes shown from the side.

Referring to FIG. 3, light from a laser source 310 is split by a beam splitter 310a into a detection light beam 312 and a reference light beam 313. The detection beam 312 is directed onto an upper surface (back) of the cantilever beam at its free end where the tip 201 is mounted. Light reflected from the back of the cantilever beam propagates to a position sensitive detector (PSD) 311, typically a split or quadrant photodiode, which generates an output that is representative of the deflection angle of the cantilever beam.

The detection beam 312 is focused by an objective lens 314 onto the back of the cantilever. After reflection from the cantilever, the reflected beam is split by a first beam splitter 315. A first component 316 is directed to the deflection detector 311 and a second component 317 is directed to an interferometer height detector 318.

Inside the interferometer height detector 318, the beam 317 that has been reflected from the cantilever is split by a beam splitter 320. The reference beam 313 is directed from a reflector 321 onto a retro-reflector 322 and thereafter to the beam splitter 320. The retro-reflector 322 is aligned such that it provides a fixed optical path length which does not change as the vertical (z) position of the support 151 is changed by operation of the piezoelectric driver 210.

The beam splitter 320 has an energy absorbing coating and splits both incident 317 and reference 313 beams to produce first and second interferograms with a relative phase shift of 90 degrees. The two interferograms are detected respectively at photodetectors 323, 324.

Ideally, the photodetector signals are complementary sine and cosine signals with a phase difference of 90 degrees. Further, they should have no dc offset, have equal amplitudes and only depend on the position of the cantilever and wavelength of the laser 310. Known methods are used to monitor the outputs of the photodetectors 323, 324 while changing the optical path difference in order to determine and to apply corrections for errors arising as a result of the two photodetector signals not being perfectly harmonic, with equal amplitude and in phase quadrature. Similarly, dc offset levels are also corrected in accordance with method known in the art.

These photodetector signals are suitable for use with a conventional interferometer reversible fringe counting apparatus and fringe subdividing apparatus, which may be provided as dedicated hardware or as a programmed computer. Phase quadrature fringe counting apparatus is capable of measuring displacements in the position of the cantilever to an accuracy of $\Delta/8$. That is, to 66 nm for 532 nm light. Known fringe subdividing techniques, based on the arc tangent of the signals, permit an improvement in accuracy to the nanometer scale or less.

Interferometric methods of extracting the path difference between two coherent beams are well known in the art and so will not be described in any further detail.

The interferometer described herein is one example of a homodyne system. The particular system described offers a number of advantages to this application. The use of two phase quadrature interferograms enables the measurement of cantilever displacement over multiple fringes, and hence over a large displacement range. The use of a phase-shifting coating on the beamsplitter 320 renders the interferometer insensitive to polarisation effects, for example arising from changes in polarisation as the light beam is reflected from the cantilever. Examples of an interferometer based on these principles are described in U.S. Pat. No. 6,678,056 and WO2010/067129. Alternative interferometer systems capable of measuring a change in optical path length may also be employed with this invention. A suitable homodyne polarisation interferometer is described in EP 1 892 727 and a suitable heterodyne interferometer is described in U.S. Pat. No. 5,144,150.

The height information extracted by the detection system 318 ideally represents the true instantaneous height of the probe in the Z direction. This is ideally independent of the position of the base of the probe relative to the tip i.e. of the shape of the cantilever relative to the support 151.

Returning back to FIG. 2—probe cyclic motion is generated by a fast feedback controller 225 which controls a laser 226 that directs a cyclic actuation beam with an intensity variation set by the controller 225 onto the cantilever beam. The cantilever beam 200 is a thermal biomorph structure, the materials of which undergo differential expansion when heated. That is, the cantilever beam 200 is composed of two (or more) materials, with differing thermal expansions. Typically, this will be a silicon or silicon nitride base with a gold or aluminium coating. The coating extends the length of the cantilever and covers the reverse side from the tip. The laser 226 preferably emits light of one or more wavelengths at which there is a maximum or peak in the absorption spectrum for the particular coating. For example the wavelength may be around the aluminium absorption peak at ~810 nm. Other coating/wavelength combinations can be used, for example gold has a higher absorption below 500 nm light. When this light is incident on the coating side of the cantilever, the aluminium expands to a greater degree than the silicon nitride, bending the cantilever such that the tip moves downwards, towards the sample. If illumination intensity is increased, the tip therefore moves closer to the sample surface. Conversely, if the intensity is lowered, bending is decreased and the tip moves away from the sample. Other arrangements of coating and base materials may result in bending in an opposite direction in response to illumination.

The result of the differing thermal expansion of the bimorph materials is a flexural movement of the probe in an essentially vertical (Z) direction towards and away from the sample.

The operation of the microscope will now be described based on a mode of operation described in further detail in WO2012/104625. However other modes of operation are possible.

During the course of a measurement the probe is cycled by the cyclic actuation beam from the laser 226 and moved towards the sample until the sample is detected, at which point the probe is retracted and the height recorded at the point of surface detection. An SPM data set (in this case an image of the surface height) is then created by repeating this process while scanning the probe in X and Y over the sample with the probe positioning system 210, generally following a raster pattern although any X,Y sequence could be followed. The central point of the raster scan area provides the central point of the SPM image and is referred to below as the datum axis of the SPM 150.

The probe positioning system 210 also controls the height of the probe support above the surface (in the Z direction) and is operated to maintain the probe cyclic amplitude at a set average level, where the "probe cyclic amplitude" is the height difference for each cycle between the fully retracted position and the point of surface detection.

The amplitude of the probe cycles in the height signal can be extracted by a control unit 205 and used as the parameter on which to determine the Z adjustments. The output from the control unit 205 is input to a slow feedback controller 228, which instructs adjustment of the probe positioning system 210, which in turn moves the Z position of the probe support 151, to return the amplitude of probe cycle to its set point.

The probe velocity, or equivalently rate of change of the height signal, will fall as the tip encounters and begins to interact with the surface. An indication of the surface position is therefore extracted from the point within each cycle at which its rate of change falls below a threshold level for a set period of time. This provides a measure of surface height at the probe's X,Y position that can be used to construct an image. Each data point is mapped to the scan X,Y position and so forms a point or pixel on the image.

The detection beam 312 is scanned during imaging so that it remains fixed relative to the probe during the raster scanning motion of the probe. This scanning motion of the detection beam 312 is performed by a probe tracking system 230 shown schematically in FIG. 1. A cyclic actuation beam from the laser 226 and a probe selection beam from a laser 227 are also scanned by the probe tracking system 230 so that they remain on the probe as it scans in XY. Details of a probe tracking system is described in WO2013/114100, the details of which are incorporated herein by reference. The probe tracking system 230 may comprise for example a beam steering mirror which is rotated to generate the scanning motion of the beams, an electro-optical-modulator (EOM) or an acousto-optical modulator (AOM). The mirror, EOM or AOM vary the angle at which the beams enter the objective lens 314 to generate the scanning motion.

The detection beam 312 illuminates the probe at a datum detection point 206 when it is at a central point of the scan area, a vertical line through this datum detection point 105 providing a datum axis of the SPM 150.

Alternatively the relative motion between the probe support 151 and the sample 103 may be generated by keeping the probe support 151 stationary and moving the sample 103 with the XY sample stage 110. In this case no probe tracking system 230 would be required for the radiation beams. Again, the datum axis of the SPM 150 can be defined as the point 206 at which the detection beam 312 illuminates the probe when it is at a central point of the scan area.

In a further alternative embodiment, the scanning motion of the beams may be generated by moving the objective lens 314 in X and Y, rather than varying the angle at which the beams enter the objective lens 314. In this case if the detection beam 312 enters the objective lens 314 parallel to its optical axis then the datum axis of the SPM 150 can be defined as the optical axis of the objective lens when it is at a central point of the scan area.

Figure 2:
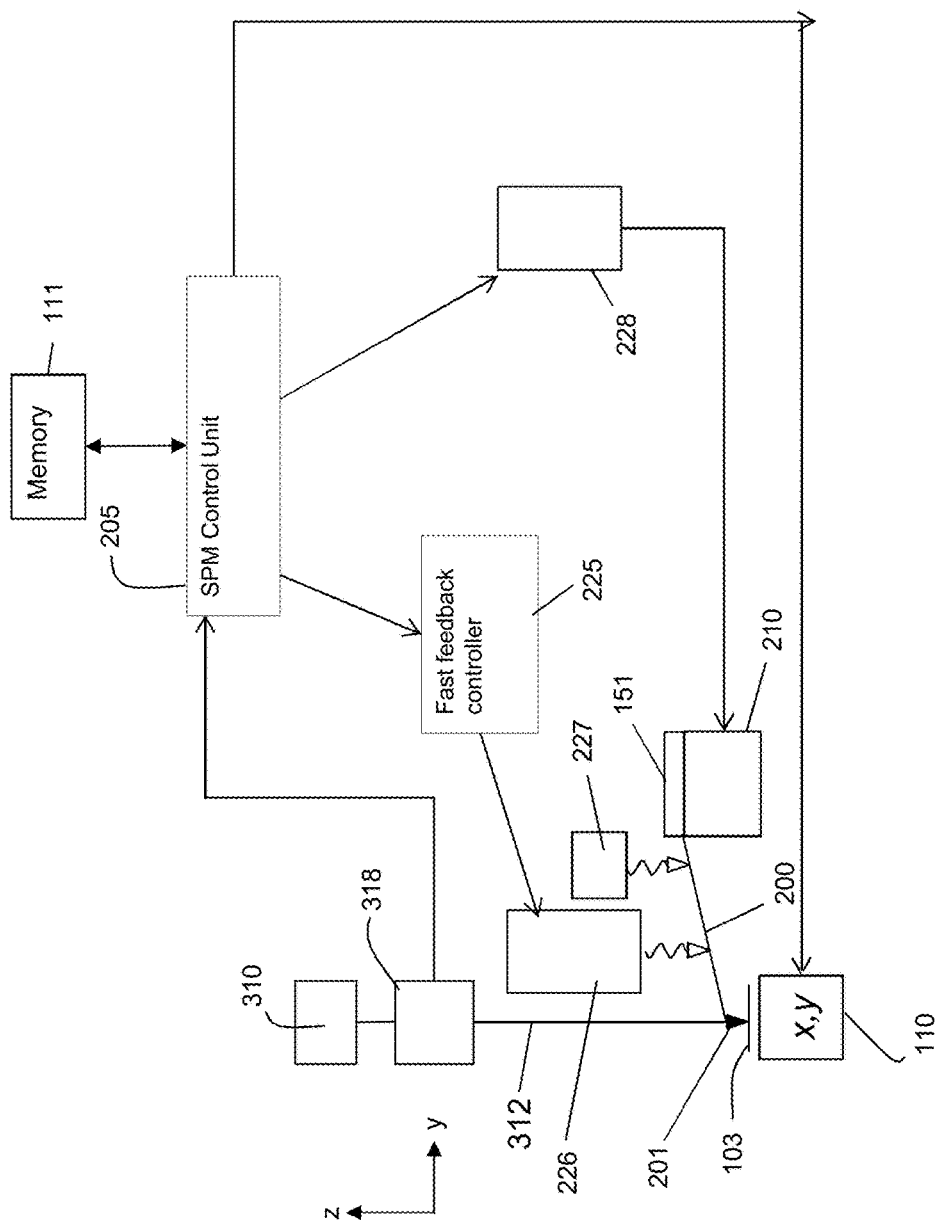
FIG. 2 is a schematic view of the scanning probe microscope, with a selected one of the probes shown from the side.

As shown in FIG. 1, the probe support 151 carries a plurality of probes—in this case five—each having a probe tip. The tip of the central probe is labelled 201 and shown in FIG. 2. The tips of the other four probes in the array are labelled 201a-d and shown in FIG. 1 only. The cantilever beam 200 of the central probe is shown in FIG. 2 but is not visible from the viewpoint of FIG. 1. Only one of these five probes is used at any one time to scan the sample. In the case of FIG. 1 the probe tip 201 of the central probe has been selected for scanning the sample, and the other four probe tips 201a-d are shown in a retracted position in which they lie in a common plane in which they do not interact with the sample 103. In order to select a particular probe, the probe support 151 is moved in the X-direction (and possibly also in the Y-direction) by the probe positioning system 210 so that the selected probe is aligned with the cyclic actuation beam from laser 226, the probe selection beam from laser 227, and the detection beam 312. The probe selection laser 227 is then turned on to illuminate the selected probe with a probe selection beam which causes the selected probe to bend down so its tip 201 moves towards the sample and out of the common plane as shown in FIG. 1, with the unselected probe tips 201a-d remaining retracted in the common plane during the duration of the scan by the selected probe tip 201. The probe selection laser 227 remains turned on during a scan. Fine cyclical Z-motion of the selected probe tip 201 during the scan is driven by the actuation laser 226.

After a scan is complete then it may be desirable to scan the same sample with one of the previously unselected probe tips 201a-d in order to determine some other property of the sample. Alternatively the selected probe tip 201 may become worn or otherwise damaged, in which case one of the previously unselected probe tips 201a-d may be required as a replacement. To switch between probes the probe support 151 is moved in the X-direction (and possibly also in the Y-direction) by the probe positioning system 210 so that the currently selected probe is de-selected and the newly selected probe is moved to the aligned position in which it is aligned with the optical axis of the SPM under the detection beam 312, the cyclic actuation beam and the probe selection beam.

Figure 7:
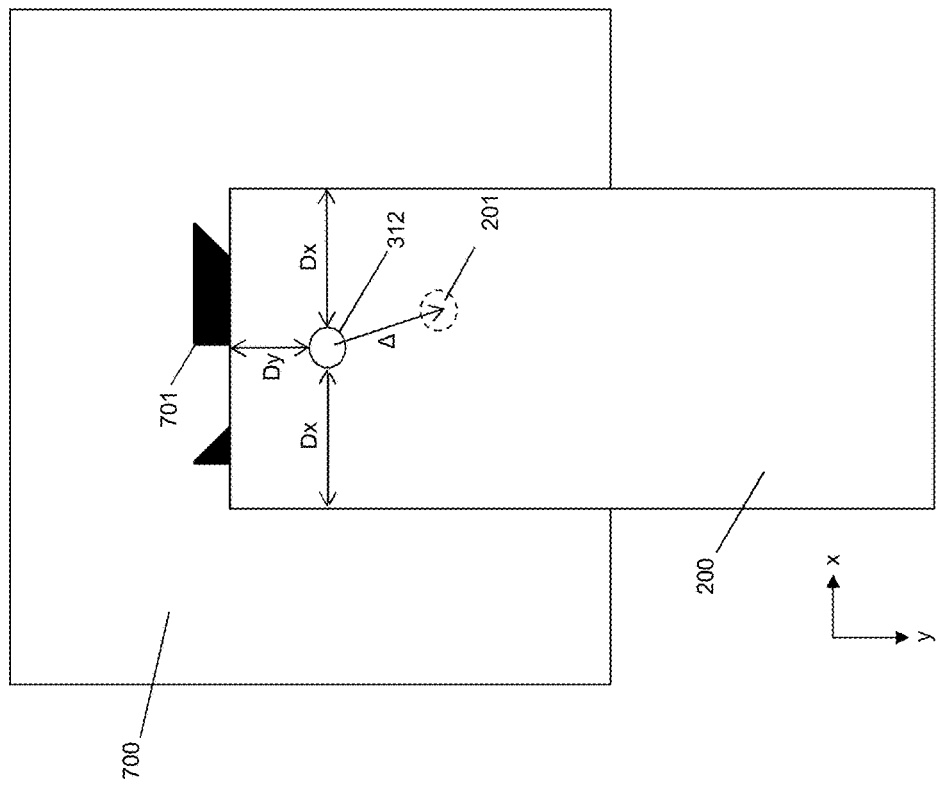
FIG. 7 is a plan view of a probe and calibration sample.

Alignment of the newly selected probe with the optical axis of the SPM is achieved automatically by the following process. First the probe support is moved until the signals from the position sensitive detector (PSD) 311 and photodetectors 323, 324 increase—indicating that the newly selected probe is being illuminated by the detection beam 312, which is positioned by the probe tracking system 230 at the datum detection point at the centre of the scan area (or at some known offset from the datum detection point). The objective lens 314 is then moved in the Z-direction to focus the detection beam onto the back of the probe. The probe support 151 is then moved in the positive X direction until the signals decrease (indicating that detection beam 312 has fallen off the right-hand side of the cantilever beam 200). The probe support 151 is then moved in the negative X direction until the signals decrease again (indicating that the detection beam 312 has fallen off the left-hand side of the cantilever beam 200). The probe support 151 is then moved back to the mid-point between these two positions (so the detection beam 312 is now on the centre-line of the cantilever beam 200). Next the probe support 151 is moved in the positive Y direction until the signals decrease again (indicating that the detection beam 312 has fallen off the free end of the cantilever beam 200). Finally the probe support 151 is moved back in the negative Y direction by a predetermined distance Dy, so the detection beam is positioned on the centre-line, at a distance Dy from the end of the cantilever beam 200. FIG. 7 shows the detection beam 312 positioned on the probe after this alignment process, at a distance Dy from the free end of the cantilever beam 200 and a distance Dx from each side. Alternatively, instead of using the method described above, the probe may be aligned with the optical axis of the SPM by another method such as a wide field optical vision system.

Figure 4:
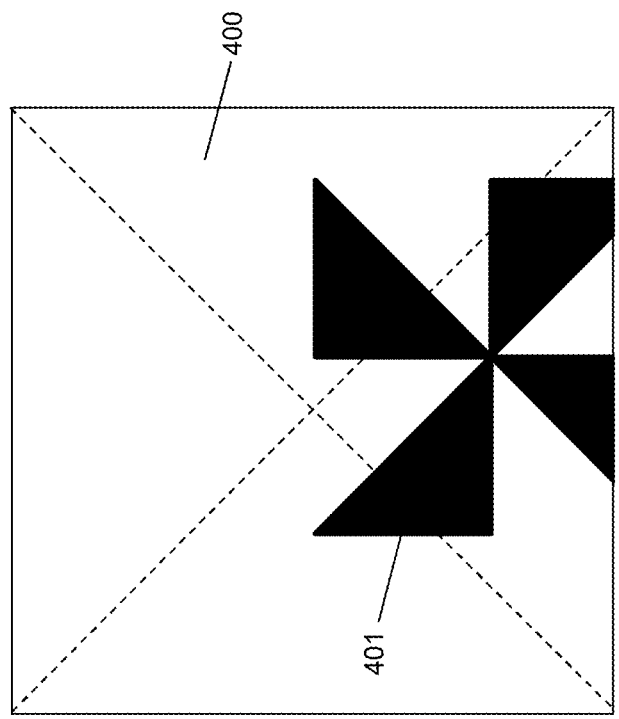
FIG. 4 shows a SEM calibration image including part of a fiducial marker.

In a calibration step, a calibration sample 700 (FIG. 7) with a fiducial marker 701 is imaged with the SEM 100 to generate an SEM calibration data set which is represented in FIG. 4 as an image 400 of the calibration sample. Part of the SEM calibration data set contains fiducial data from at least part of the fiducial marker (represented in FIG. 4 as an image 401 of part of the fiducial marker). The fiducial marker 701 must be visible to both the SEM and the SPM with high contrast, and could have a variety of forms. For example the marker 701 may have topographic features (in other words a variation in height) with sharp well-defined edges which can be detected with high contrast by both the SEM and the SPM.

Figure 5:
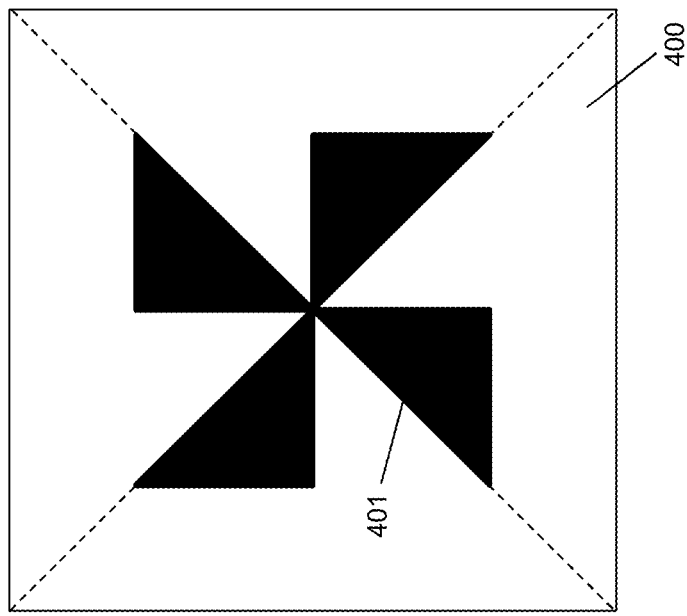
FIG. 5 shows a SEM calibration image with a fiducial marker at its centre.

The calibration sample is then moved in X and Y by the XY sample stage 110 until the image 401 lies at the centre of the image 400 as shown in FIG. 5. Centralisation of the image 401 is achieved automatically by operation of the SPM control unit 205 which analyses the image data to determine the position of the centre of the image 401 and operates the XY sample stage 110 until the centre of the image 401 is aligned with the centre of the image 400.

The XY sample stage 110 is then operated to move the sample support 110a by a pre-determined datum vector T shown in FIG. 1. This motion must be sufficiently accurate so that the calibration sample is moved to a position within the field of view of the SPM 150, which will typically be in the range of microns. Therefore the XY sample stage 110 must be capable of moving the calibration sample with an accuracy of less than 5 microns, preferably less than 100 nm and most preferably less than 10 nm. The datum vector T is known accurately and stored in a memory 111, being the offset between the datum axis of the SEM 100 and the datum axis of the SPM 150. This brings the centre of the fiducial marker precisely into alignment with the datum axis of the SPM 150.

Figure 6:
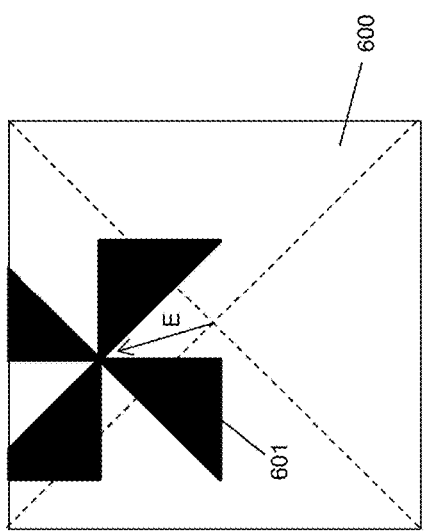
FIG. 6 shows an SPM calibration image from a first probe including part of a fiducial marker.

The calibration sample is then imaged with the SPM 150 to acquire an SPM calibration data set which is represented in FIG. 6 as an image 600 of the calibration sample. Part of the SPM calibration data set contains fiducial data from at least part of the fiducial marker (represented in FIG. 6 as an image 601 of part of the fiducial marker). FIG. 7 is a view of a probe cantilever beam 200 viewed from above during the scanning of a calibration sample 700 with a fiducial marker 701. As described above, the selected probe is positioned by the probe positioning system 210 so that the detection beam 312 is at a precise distance Dy from the end of the cantilever beam 200 and Dx from the two sides of the cantilever beam 200. Ideally if the probe tip 201 is also positioned by a distance Dy from the end of the cantilever and Dx from the two sides of the cantilever (i.e. directly below the detection beam 312) then the image 601 would lie at the centre of the image 600. However, manufacturing errors can result in the probe tip 201 being offset slightly from its intended position by a tip error vector Δ shown in FIG. 7. This causes the image 601 of the fiducial marker to be offset from the centre of the image 600 by an image error vector E shown in FIG. 6. This tip error vector Δ may be caused by imperfections in the physical structure of the tip or the cantilever beam from the ideal shown in the drawings.

Note that the tip error vector Δ cannot be directly derived from the image error vector E, since the offset of the image 600 from the centre of the image may also be influenced by other factors such as errors in the accuracy of the XY sample stage 110.

In order to determine this image error vector E, the calibration sample is moved by the XY sample stage 110 until the image 601 of the fiducial marker lies at the centre of the image 600. This enables the system to determine the image error vector E for a given probe. Alternatively the image error vector E can be calculated without moving the sample, by analysing the image data to determine the offset of the image 601 from the centre of the image 600. This alternative method is faster but potentially less accurate than the method in which the calibration sample is moved and a series of additional images acquired until the image 601 lies at the centre of the image 600. In other words there is a trade-off between speed and accuracy.

An error-corrected offset vector (T−E) is then calculated in accordance with the image error vector (E) and the datum vector (T), and stored by the SPM control unit 205 in the memory 111. Now for a given probe the system can switch between the SEM and SPM by operating the XY sample stage 110 to move the sample by the stored offset vector +/−(T−E).

Figure 8:
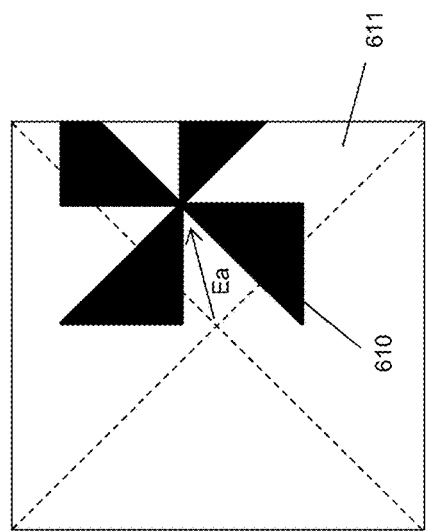
FIG. 8 shows an SPM calibration image from a second probe including part of a fiducial marker.

The calibration process described above is performed for each one of the probe tips 200, 201a-201d. Each one of the probe tips will have a different image error vector. FIG. 8 shows an image error vector Ea of an image 610 of the fiducial marker within an image 611 acquired by the probe tip 201a.

When the probe tip 201a is selected, then for the newly selected probe tip 201a the system can switch between the SEM and SPM by operating the XY sample stage 110 to move the sample by a new error-corrected offset vector offset vector (T−Ea), where Ea is the image error vector for the newly selected probe tip 201a.

A new probe is selected by moving the probe support 151 so the new probe is brought into alignment with the detection beam 312, rather than by moving the detection beam 312 into alignment with the new probe by either translating the objective lens 314, or changing the angle of the beam 312 as it enters the objective lens 314 by operation of the tracking system 313. As a result the datum vector T remains constant regardless of the probe being used.

Figure 10:
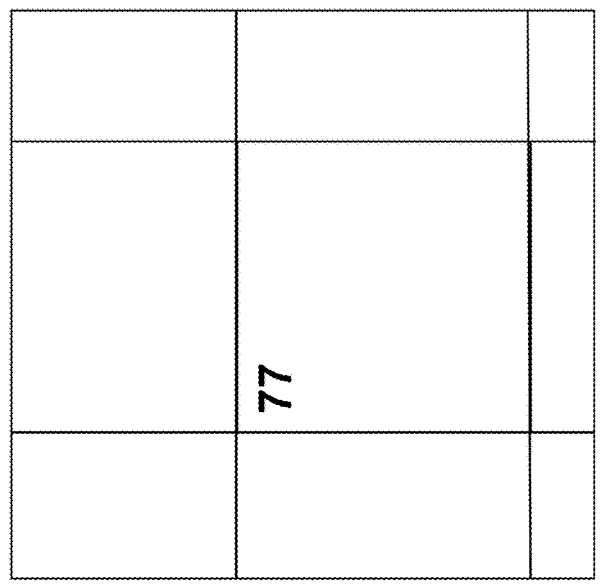
FIG. 10 shows an image of the calibration sample which contains at least one grid number.
Figure 9:
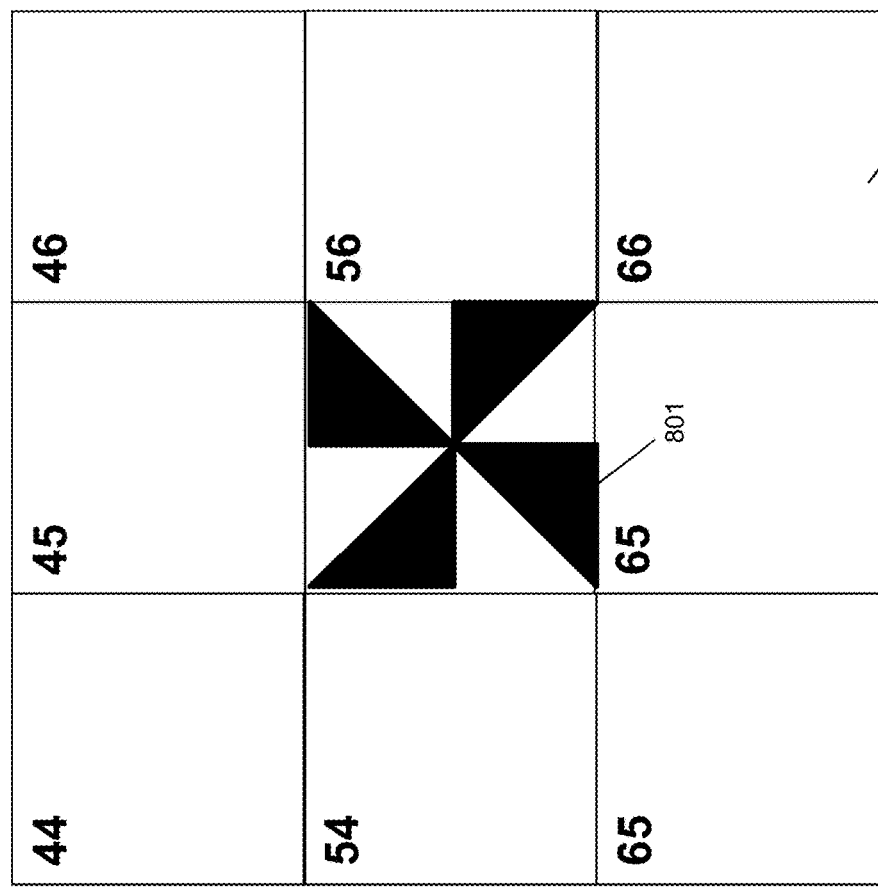
FIG. 9 shows a calibration sample with a grid.

As previously mentioned, the datum vector T is known accurately and stored in the memory 111, being the offset between the datum axis of the SEM 100 and the datum axis of the SPM 150. The datum vector T may be determined in a number of ways. It may be known accurately by design. Alternatively it may be measured by an external instrument. Alternatively it may be determined by an iterative process using the calibration sample 800 of FIG. 9. The calibration sample 800 carries a 9×9 grid of squares. Each square carries a grid number from 1 to 81 which is visible to both the SPM and the SEM. FIG. 9 shows a 3×3 grid at the centre of the 9×9 grid. The central square of the grid is occupied by a fiducial marker 801 which is visible to both the SEM and the SPM (like the fiducial marker 701 previously described). The SEM acquires an image of the calibration sample 800 which contains at least one grid number, an example being shown in FIG. 10. In this example the sample 800 is positioned relative to the field of view of the SEM so that the square numbered 77 is visible. This grid number 77 is detected automatically in the image, which enables the SEM to move the sample in X and Y until the fiducial marker 801 (which is known to occupy the square with grid number 55) is at the centre of the SEM's field of view. A coarse estimate T(coarse) of the datum vector T is known by design sufficiently accurately that the sample 800 can then be moved so that it is underneath the detection beam 312 of the SPM, but not sufficiently accurately to ensure that the fiducial marker 801 is at the centre of field of view. Next an image of the calibration sample aligned with the detection beam 312 of the SPM is acquired by an optical microscope (not shown). This image will contain the entire 9×9 grid, and also an image of the spot where the detection beam 312 illuminates the calibration sample (note that the SPM is not carrying a probe at this point, so the detection beam 312 illuminates the calibration sample 800 rather than a probe). Automated analysis of this image enables the SPM to determine which square in the grid that the detection beam 312 is aligned with. Once the number of this grid is known, then the sample is moved by a correction vector Δc so that the centre of the fiducial marker 801 is illuminated by the detection beam 312. The datum vector T=T(coarse)+Δc is now known to a high degree of accuracy and is stored in the memory 111 for use in the process described above.

As shown in FIG. 1, the detection beam 312, the cyclic actuation beam from the laser 226, and the probe selection beam from the laser 227 all pass through a window 360 from a non-evacuated region outside the vacuum chamber 120a into the vacuum chamber 120a. This makes it unnecessary to pass electrical power cables into the vacuum chamber in order to provide power for the beams or for an alternative probe actuation system such as a resistive heater or piezoelectric material.

Figure 11:
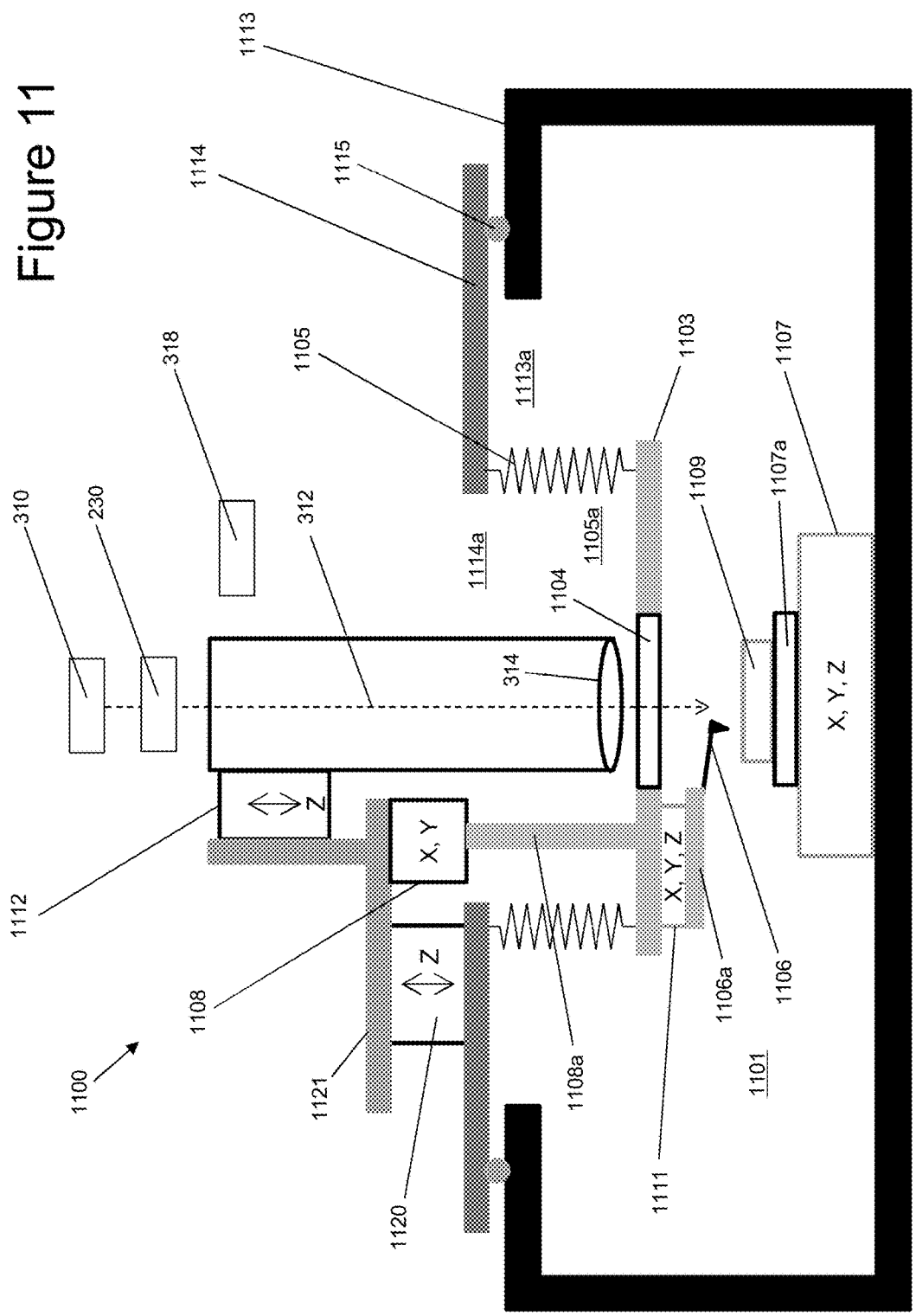
FIG. 11 shows a scanning probe microscope with a probe carried by a movable window unit, and the probe in an un-aligned position.

FIG. 11 shows a scanning probe microscope (SPM) 1100 comprising an enclosure containing a sealed vacuum chamber 1101. The enclosure is made up of multiple parts, namely: a base 1113; a window holder 1114; a window mount 1103; a transparent window 1104; and bellows 1105. The bellows 1105 are stainless steel edge-welded bellows—i.e. a stack of hoops with each hoop welded at its edge to two adjacent hoops forming a corrugated structure. The window 1104 is carried by the window mount 1103, and the window 1104 and window mount 1103 will be collectively referred to below as a window unit 1103, 1104.

The base 1113 has an opening 1113a, and the window holder 1114 is removably attached to the base 1114 around a periphery of the opening 1113a. An O-ring 1115 seals the interface between the base 1113 and the window holder 1114. The window holder 1114 can be detached from the base 1113 to gain access to the vacuum chamber 1101, in order to replace a probe 1106 or a sample 1109 in the vacuum chamber 1101. Alternatively the probe 1106 or sample 1109 may be replaced by accessing the chamber via another route.

The window holder 1114 has an opening 1114a, and the bellows 1105 connect the window mount 1103 to the window holder 1114 around a periphery of the opening 1114a. The bellows 1105 surround an interior volume 1105a which is outside the vacuum chamber 1101. The base 1113 and the window holder 1114 together provide a body of the enclosure. The body 1113, 1114 of the enclosure does not move as the window unit 1103, 1104 moves to bring the probe into alignment with a detection beam 312 as described below.

The SPM 1100 is similar to the SPM 150 shown in FIG. 1-3, so common reference numbers are used where appropriate, and only the differences will be illustrated and described in detail. Specifically, the SPM 1100 has an interferometer-based detection system including all of the elements shown in FIG. 3, and a probe actuation system including all of the elements shown in FIGS. 1 and 2. Most of the elements of these detection and actuation systems are omitted from FIGS. 11 and 12, apart from the objective lens 314, the laser source 310 which generates the detection beam 312, the probe tracking system 230 which scans the detection beam 312 during imaging so that it remains fixed relative to the probe during the raster scanning motion of the probe, and the interferometer height detector 318. The laser source 310 and probe tracking system 230 are both positioned outside the vacuum chamber 1101, and arranged to direct the detection beam 312 through the window 1104 into the vacuum chamber 1101 via the objective lens 314. The height detector 318 is also outside the vacuum chamber 1101.

A probe 1106 inside the vacuum chamber 1101 is carried by the window mount 1103. A sample 1109 is mounted on a sample support 1107a of a sample stage 1107 in the vacuum chamber 1101.

A lens actuator 1112 is arranged to move the objective lens 314 in the axial (Z) direction towards or away from the window 1104 and the probe 1106 in order to focus the detection beam 312 on the probe 1106. The lens actuator 1112 is typically an electric motor or other transducer with a range of motion of the order of several mm.

A probe positioning system in the form of a lateral probe drive motor 1108 is connected to the window mount 1103 by a drive arm 1108a. The lateral probe drive motor 1108 is arranged to move the window unit 1103, 1104 in the lateral (XY) direction in order to move the probe from an unaligned position in which it is not illuminated by the detection beam 312, as shown in FIG. 11, to an aligned position in which it is illuminated by the detection beam 312 and the detection beam is reflected by the probe to generate a reflected detection beam 312a, as shown in FIG. 12.

The lateral probe drive motor 1108 is arranged to move the probe 1106 laterally relative to the detection beam 312—i.e. at right angles to the optical axis of the lens 314 and so it moves across the detection beam 312. This lateral probe alignment movement aligns the probe 1106 with the detection beam 312. The probe 1106 and window unit 1103, 1104 also move relative to the body 1113, 1114 of the enclosure as they move laterally relative to the detection beam 312. The detection beam 312 may or may not be turned on during this lateral probe alignment movement.

Figure 12:
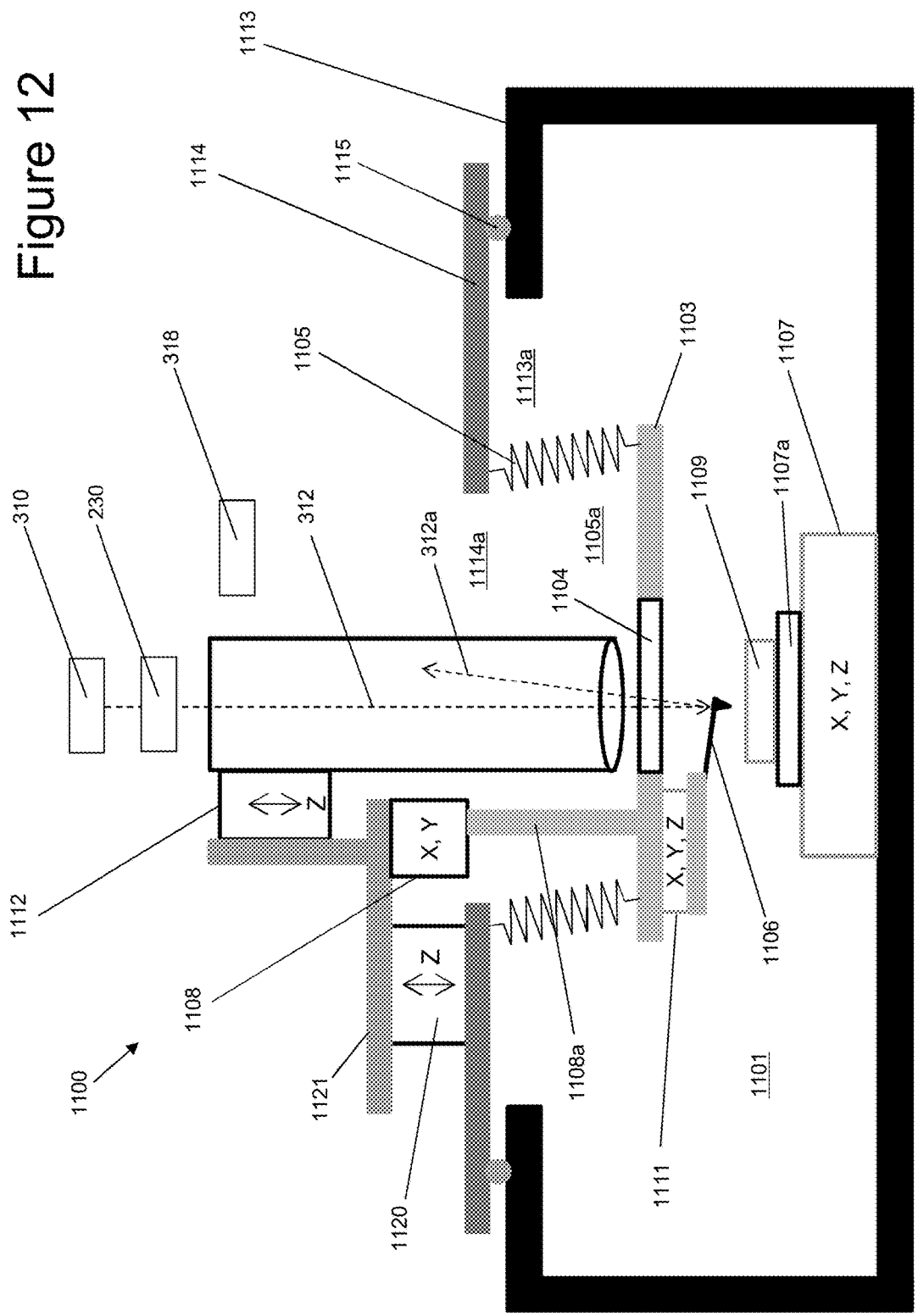
FIG. 12 shows the probe in an aligned position under the detection beam.

The bellows 1105 are arranged to flex laterally to accommodate the movement of the window unit in the lateral (XY) direction as shown in FIG. 12. This lateral flexing of the bellows 1105 is a mode of motion which is not traditionally associated with a bellows—i.e. bellows will more typically only expand and contract axially so the folds or corrugations of the bellows open and close.

FIG. 12 shows the window unit moved laterally in the Y direction (i.e. moved to the right) relative to FIG. 11, but it will be appreciated that the bellows 1105 can flex laterally not only in the Y direction but also in the X direction (perpendicular to the plane of FIG. 11). The probe 1106 may be moved by the lateral probe drive motor 1108 following probe replacement, when a probe becomes damaged or worn over time and requires replacing with a new probe, for example. Alternatively, such motion may be for replacement of a probe with a different probe that measures an alternative characteristic of the sample. Alternatively still, in an SPM with multiple probes, movement of the probe in this manner may be used to select one probe from the multiple probes for use in measurement of the sample.

An axial probe drive motor 1120 is connected to the window mount 1103 by a plate 1121, the lateral probe drive motor 1108 and the drive arm 1108a. The axial probe drive motor 1120 is arranged to move the window unit 1103, 1104 and the probe 1106 in the axial (Z) direction towards and away from the sample support 1107a. The bellows 1105 are arranged to expand axially to accommodate this movement towards the sample support 1107a. The axial probe drive motor 1120 is typically an electric motor or other transducer with a range of motion of the order of several mm.

The probe 1106 comprises a cantilever beam carrying a conical or pyramidal tip. The cantilever beam extends from a probe support 1106a which is carried by a scanner 1111 which is carried in turn by the window mount 1103. The scanner 1111 is arranged to generate a relative lateral (XY) raster-scanning motion between the probe 1106 and the sample support 1107a. The scanner 1111 is typically a piezoelectric device, or other transducer, with a maximum range of motion of the order of 5-10 microns. During this raster-scanning motion, the probe 1106 moves laterally relative to the window unit 1103, 1104, and the probe tracking system 230 scans the detection beam 312 so that it remains aligned with the probe. The scanner 1111 is also arranged to generate a relative axial (Z) motion between the probe 1106 and the sample support 1107a in order to provide fine control of the approach of the probe to the sample 1109. The interferometer height detector 318 detects the reflected detection beam 312a during the relative scanning motion to collect a data set from the sample 1109.

As mentioned above, the lateral probe drive motor 1108 and the axial probe drive motor 1120 are each typically an electric motor or other transducer with a large range of motion, of the order of several mm. Such electric motors can generate particles which would contaminate a vacuum chamber, so locating the motors 1108, 1120 outside the vacuum chamber 1101 provides a distinct advantage. This advantage also applies for other controlled environments which are not vacuum chambers. The piezoelectric scanner 1111 does not generate particles to the same extent, so it can be located in the vacuum chamber 1101 without contaminating the upper face of the sample. The sample stage 1107 incorporates an actuation system (not shown) which drives the sample support 1107a in X, Y and Z. If a large range of motion is required, then the sample support 1107a can be driven by an electric motor or other transducer with a large range of motion, of the order of several mm or several cm. Since the sample stage 1107 is positioned below the sample 1109, without a direct line of sight to the upper face of the sample 1109, any particles generated by this motor will tend not to contaminate the upper face of the sample.

Figure 13:
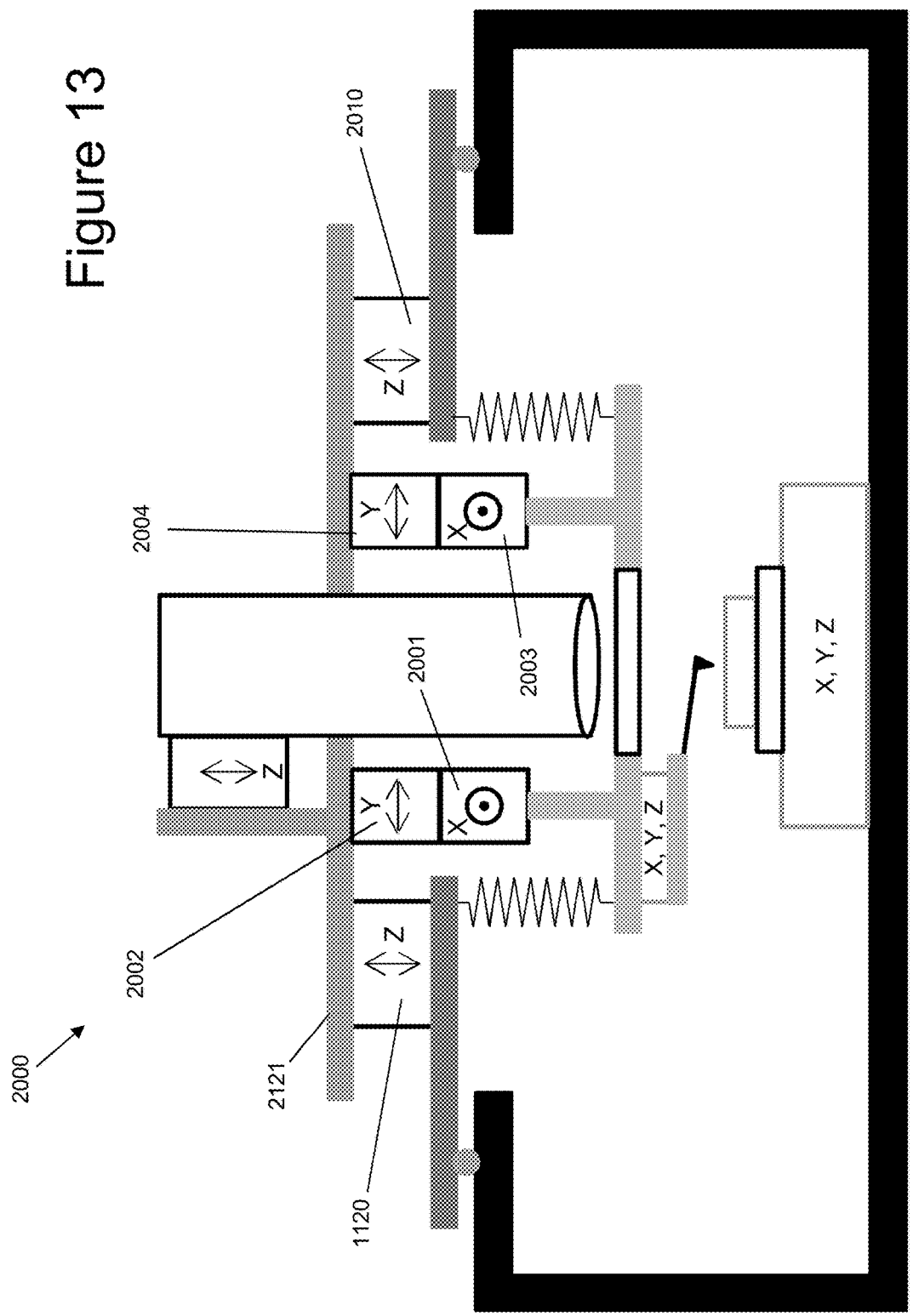
FIG. 13 shows a probe microscope with a symmetrical drive system.

FIG. 13 shows an alternative SPM 2000 which is identical to the SPM 1100 in most respects, so only the differences will be described. The lateral probe drive motor 1108 in the SPM 1100 can drive the probe in both X and Y directions, but in FIG. 13 the lateral probe drive motor 1108 is replaced by an X-drive motor 2001 which drives the window unit laterally in the X-direction and a Y-drive motor 2002 which drives the window unit laterally in the Y-direction.

The cantilevered plate 1121 in the SPM 1100 is replaced by a ring 2121 carrying an additional X-drive motor 2003 which drives the window unit laterally in the X-direction (in tandem with the X-drive motor 2001) and an additional Y-drive motor 2004 which drives the window unit laterally in the Y-direction (in tandem with the Y-drive motor 2002). The ring 2121 also carries an additional axial probe drive motor 2010 to move the window unit and the probe in the axial (Z) direction towards the sample stage (in tandem with the axial probe drive motor 1120).

The SPM 2000 has a more symmetrical structure and probe drive arrangement, with increased rigidity and stability compared with the cantilevered plate 1121 and asymmetrical probe drive arrangement in the SPM 1100.

In FIG. 13 there are two X-drive motors 2001, 2003; two Y-drive motors 2002, 2004; and two Z-drive motors 1120, 2010 which drive the window unit in tandem on opposite sides of the window unit. In an alternative there may be only a single X-drive motor 2001, a single Y-drive motor 2002 and a single Z-drive motor 1120, and the additional motors 2003, 2004, 2010 replaced by X, Y and Z bearings which provide the increased rigidity and stability.

FIGS. 11-13 show a measurement system consisting of an SPM 1100, 2000 in a vacuum chamber, with no scanning electron microscope (SEM). FIG. 14 shows the SPM 1100 integrated into a measurement system which also has an SEM 100 in the same vacuum chamber. The SPM 1100 in FIG. 14 is identical to the SPM 1100 in FIG. 11, except that the base of the vacuum chamber has been enlarged to accommodate the SEM 100.

The SEM 100 is identical to the SEM 100 in FIG. 1, so will not be described again. The measurement system of FIG. 14 can be operated in an identical fashion to the measurement system described in FIGS. 1-10, so this will not be described again.

In the measurement system of FIGS. 1-10, a piezoelectric probe positioning system 210 inside the vacuum chamber moves the probe 200, 201 laterally (in X and Y) to align the probe with the cyclic actuation beam from laser 226, the probe selection beam from laser 227, and the detection beam 312. The probe positioning system 210 also generates the X, Y raster scanning of the probe during imaging. The maximum range of movement of the piezoelectric probe positioning system 210 is typically of the order of tens of microns. In the measurement system of FIG. 14, the piezoelectric scanner 1111 in the vacuum chamber is only used to control fine motion of the probe, and the more coarse probe alignment motion is performed instead by the lateral probe drive motor 1108 which is outside the vacuum chamber and has a range of motion of the order of several mm.

The piezoelectric scanner 1111 only has to move the probe 1106 and probe support 1106a, which collectively have a relatively low mass enabling them to be scanned in a raster pattern with a low amplitude and high frequency by the piezoelectric scanner 1111. The lateral probe drive motor 1108 has to move not only the probe 1106 and probe support 1106a, but also the window unit 1104, 1104 and drive arm 1108. These collectively have a much higher mass than the probe 1106 and probe support 1106a, but this is acceptable since the probe alignment motion imparted by the lateral probe drive motor 1108 has higher amplitude but also much lower frequency than the motion imparted by the piezoelectric scanner 1111.

Although the invention has been described above with reference to one or more preferred embodiments, it will be appreciated that various changes or modifications may be made without departing from the scope of the invention as defined in the appended claims.

The invention claimed is:

1. A measurement system comprising:
a probe;
a radiation source arranged to generate a detection beam for reflection by the probe to generate a reflected detection beam;
a probe positioning system arranged to move the probe laterally relative to the detection beam to align the probe with the detection beam;
a scanner for generating a relative scanning motion between the probe and a sample, the sample being aligned with the probe and interacting with the probe during the relative scanning motion;
a sensor for detecting the reflected detection beam during the relative scanning motion to collect a first data set from the sample;
a memory for storing an offset vector;
a device for modifying the sample or obtaining a second data set from the sample;
and a sample stage arranged to move the sample in accordance with the offset vector stored in the memory so that it becomes un-aligned from the probe and aligned with the device.

2. The system of claim 1 further comprising an enclosure containing a sealed chamber, the enclosure comprising a body and a window unit; wherein the radiation source is outside the sealed chamber; the radiation source is arranged to direct the detection beam through the window unit into the sealed chamber; the probe is inside the sealed chamber and carried by the window unit; the sample stage is inside the sealed chamber; and the probe positioning system is arranged to move the window unit relative to the body of the enclosure in order to align the probe with the detection beam.

3. The system of claim 2 further comprising a flexible seal member connecting the window unit to the body, wherein the flexible seal member is arranged to flex to accommodate the movement of the window unit relative to the body of the enclosure.

4. The system of claim 3 wherein the flexible seal member comprises bellows arranged to flex laterally to accommodate the movement of the window unit relative to the body of the enclosure.

5. The system of claim 2 wherein the sealed chamber is a vacuum chamber.

6. The system of claim 2 wherein the scanner comprises a piezoelectric actuator which is inside the sealed chamber, connects the probe to the window unit, and generates the relative scanning motion by moving the probe relative to the window unit.

7. The system of claim 2 wherein the probe positioning system is arranged to move the window unit in an axial direction relative to the body of the enclosure towards the sample stage.

8. The system of claim 1 further comprising:
a calibration sample carrying a fiducial marker; and
means for obtaining a calibration data set from the sensor, the calibration data set including fiducial data from at least part of the fiducial marker; determining an error vector from the calibration data set in accordance with a position of the fiducial data within the calibration data set; using the error vector to determine the offset vector; and storing the offset vector in the memory.

9. A scanning probe microscope comprising:
a probe;
a radiation source arranged to generate a detection beam for reflection by the probe to generate a reflected detection beam;
a probe positioning system arranged to move the probe laterally relative to the detection beam to align the probe with the detection beam;
a calibration sample carrying a fiducial marker;
a scanner for generating a relative scanning motion between the probe and the calibration sample, the calibration sample being aligned with the probe and interacting with the probe during the relative scanning motion;
a sensor for detecting the reflected detection beam during the relative scanning motion to collect a calibration data set from the calibration sample, the calibration data set including fiducial data from at least part of the fiducial marker;
means for determining an error vector of the calibration data set in accordance with a position of the fiducial data within the calibration data set; and
a memory arranged to store the error vector.

10. A scanning probe microscope comprising:
an enclosure containing a sealed chamber, the enclosure comprising a body, a window unit, and bellows connecting the window unit to the body;

a probe inside the sealed chamber, wherein the probe is carried by the window unit;

a radiation source outside the sealed chamber, wherein the radiation source is arranged to direct a detection beam through the window unit onto the probe in the sealed chamber for reflection by the probe to generate a reflected detection beam;

a sample support inside the sealed chamber;

a probe positioning system arranged to move the probe laterally relative to the detection beam to align the probe with the detection beam, wherein the probe is arranged to move relative to the body as it moves relative to the detection beam and the bellows are arranged to flex laterally to accommodate the movement of the window unit relative to the body;

a scanner for generating a relative scanning motion between the probe and the sample support; and a sensor for detecting the reflected detection beam during the relative scanning motion to collect a data set.

11. The microscope of claim 10 wherein the window unit comprises: a window mount; and a window carried by the window mount, wherein the bellows connect the window mount to the body, the radiation source is arranged to direct the detection beam through the window into the sealed chamber, and the probe positioning system is arranged to move the window mount in the lateral direction relative to the body of the enclosure.

12. The microscope of claim 10 wherein the scanner comprises a piezoelectric actuator which is inside the sealed chamber, connects the probe to the window unit, and generates the relative scanning motion by moving the probe relative to the window unit.

13. The microscope of claim 10 wherein the radiation source comprises a lens, and the apparatus further comprises a lens actuator arranged to move the lens towards or away from the window unit and the probe in order to focus the detection beam on the probe.

14. The microscope of claim 10, wherein the body of the enclosure comprises an opening with a periphery; the bellows connects the window unit to the body around the periphery of the opening; and the bellows surrounds an interior volume which is outside the sealed chamber.

15. The microscope of claim 10, wherein the body of the enclosure comprises a base, and a window holder attached to the base; the bellows connect the window unit to the window holder; and the window holder can be detached from the base to gain access to the sealed chamber.

16. The microscope of claim 10 wherein the probe positioning system is arranged to move the window unit in an axial direction relative to the body of the enclosure towards the sample support, and the bellows are arranged to expand axially to accommodate the movement of the window unit in the axial direction towards the sample support.

17. The microscope of claim 16, wherein the probe positioning system comprises a lateral drive motor arranged to move the window unit laterally relative to the detection beam; and an axial drive motor arranged to move the window unit in the axial direction.

18. The microscope of claim 10, wherein the probe positioning system is capable of moving the window unit laterally relative to the detection beam by a distance of 1 mm or more.

19. The microscope of claim 10 wherein the sealed chamber is a sealed vacuum chamber.

20. A method of calibrating a scanning probe microscope, the scanning probe microscope comprising a probe with a cantilever and a probe tip carried by the cantilever, the method comprising:

illuminating the probe with a detection beam so that the detection beam is reflected by the cantilever to generate a reflected detection beam;

moving the probe laterally relative to the detection beam until the detection beam illuminates a predetermined part of the probe;

generating a relative scanning motion between the probe and a calibration sample carrying a fiducial marker, the calibration sample interacting with the probe tip during the relative scanning motion and the detection beam continuing to illuminate the predetermined part of the probe during the relative scanning motion;

detecting the reflected detection beam with a sensor during the relative scanning motion to collect a calibration data set from the calibration sample, the calibration data set including fiducial data from at least part of the fiducial marker;

determining an error vector of the calibration data set in accordance with a position of the fiducial data within the calibration data set; and storing the error vector.

* * * * *